(12) United States Patent
Suzuki et al.

(10) Patent No.: US 8,401,059 B2
(45) Date of Patent: Mar. 19, 2013

(54) RADIO COMMUNICATION SYSTEM (75) Inventors: Junichi Suzuki, Ikeda (JP); Takashi Saeki, Hirakata (JP); Koji Sakamoto, Hirakata (JP); Masanori Kurita, Hirakata (JP)

(73) Assignee: Panasonic Corporation, Kadoma-shi (JP)

( * ) Notice: Subject to any disclaimer, the term of this patent is extended or adjusted under 35 U.S.C. 154(b) by 915 days.

(21) Appl. No.: 12/523,485

(22) PCT Filed: Jan. 16, 2008

(86) PCT No.: PCT/JP2008/051009
§ 371 (c)(1),
(2), (4) Date: Jul. 16, 2009

(87) PCT Pub. No.: WO2008/088078
PCT Pub. Date: Jul. 24, 2008

(65) Prior Publication Data
US 2010/0046596 A1 Feb. 25, 2010

(30) Foreign Application Priority Data
Jan. 17, 2007 (JP) .................................. 2007-008544

(51) Int. Cl.
*H04B 1/38* (2006.01)

(52) U.S. Cl. .................... 375/220; 375/219; 375/285

(58) Field of Classification Search .......... 375/219–220; 455/522, 574, 343.1, 74, 343, 5
See application file for complete search history.

(56) References Cited

U.S. PATENT DOCUMENTS
5,790,946 A * 8/1998 Rotzoll ...................... 455/343.1

FOREIGN PATENT DOCUMENTS
| EP | 0 714 175 A1 | 5/1996 |
| EP | 1 507 244 A1 | 2/2005 |
| EP | 1 855 260 A1 | 11/2007 |
| JP | 2006-343983 A | 12/2006 |
| WO | WO-00/21053 A1 | 4/2000 |

OTHER PUBLICATIONS
International Search Report for the Application No. PCT/JP2008/051009 mailed Jun. 25, 2008.

*Primary Examiner* — Sam K Ahn
*Assistant Examiner* — Janice Tieu
(74) *Attorney, Agent, or Firm* — Marvin A. Motsenbocker; Mots Law, PLLC (57) ABSTRACT

A radio communication system minimizes power consumption against noises. The system includes a first radio terminal (10A) with a first transmitter (40A) for transmitting a first data indicative of a specific event, and a second radio terminal (40A) with a battery (14B) and a receiver (20B). The first radio terminal (10A) includes a first bit interpolator (32A) which inserts a check bit pattern of "01010101" at a predetermined cycle into one frame of the first data. The second radio terminal (10B) has a second power controller (60B) which intermittently activates the second receiver (20B) at predetermined intervals in order to receive the bit-interpolated data from the first transmitter. A check bit detector (24B) is included in the second radio terminal (10B) to detect the check bit pattern from within the bit interpolated data and to issue a stop signal immediately upon occurrence of that the check bit pattern fails to appear at said predetermined cycle within a predetermined time frame shorter than one frame length of the first data. In response to the stop signal, the power controller of the second radio terminal terminates a current receiving operation.

16 Claims, 8 Drawing Sheets

U.S. PATENT DOCUMENTS

| | | |
|---|---|---|
| 6,255,944 B1 | 7/2001 | Addy |
| 6,539,008 B1 * | 3/2003 | Ahn et al. .................... 370/342 |
| 6,978,149 B1 * | 12/2005 | Morelli et al. ................ 455/522 |
| 2004/0203343 A1 | 10/2004 | Schropp et al. |

* cited by examiner

RADIO COMMUNICATION SYSTEM

TECHNICAL FIELD

The present invention is related to a radio communication system between battery-powered terminals.

BACKGROUND ART

There have been increased demands for low powered radio communications in a variety of home or building monitoring systems within a restricted area, for example, a fire alarm system where a multiplicity of fire detecting terminals communicate with a remote receiver for transmitting fire data detected at individual sites. In such system, because of that the detecting terminals are expected to send the fire data at only few chances and also because of that the detecting terminals are mounted to a location where no external power supply is available, the detecting terminal is preferred to be powered by an incorporated battery, as shown in a fire alarm system proposed by Japanese Patent Publication No. 2006-343983. In the system, each detecting terminal is configured to have a warning device and also a receiver for receiving the fire detection data from any one of the other detecting terminals through radio communication so that every detecting terminal can issue an alarm when any one of the detecting terminals detect the fire occurrence. Such radio communication system is likely to suffer from various environmental noises including a conflicting radio signal utilized in other radio communication system which have to be distinguished from the fire detection data on the side of the receiver. However, the noise can be distinguished only after processing the received data or signal at an expense of corresponding power on the side of the receiving terminal. For instance, the conflicting radio signal can be designated only after receiving at least a unique word contained in the signal, which necessitates undue consumption of the battery before completing to read the unique word. Thus, the system wastes the battery each time such noise is received, and therefore shortens its operation life. In this sense, the prior art system is not sufficient for reducing battery consumption while the system is idling or waiting for receiving valid data.

DISCLOSURE OF THE INVENTION

In view of the above problem, the present invention has been achieved to provide a radio communication system between battery powered terminals at a reduced power requirement, particularly in an idling condition. The radio communication system in accordance with the present invention includes a first radio terminal (10A) and a second radio terminal (10B) linked for radio communication with each other. The first radio terminal (10A) includes a first transmitter (40A) configured to transmit a first data indicative of a specific event. The second radio terminal (40B) includes a second battery (14B) energizing the second radio terminal, a second receiver (20B) for receiving the first data from the first radio terminal, a data analyzer (26B) configured to analyze the first data and generate information designated by the first data, an information provider (50B) configured to output the information, a second signal intensity detector configured to provide a receiving signal strength indication (RSSI) and to deactivate the second receiver when the RSSI is lower than a predetermined threshold. The first radio terminal (10A) is specifically designed to include a first bit interpolator (32A) which is configured to insert a check bit pattern at a predetermined cycle into one frame of the first data to make up a first bit-interpolated data to be transmitted to the second radio terminal. The check bit pattern is defined to be a bit series of "0" alternating with "1". The second radio terminal (10B) is designed to include a second power controller (60B) which is configured to intermittently activate the second receiver (20B) at predetermined intervals in order to receive the first bit-interpolated data from the first transmitter. The second radio terminal (10B) also include a second check bit detector (24B) which is configured to find whether the check bit pattern is detected from within the first bit interpolated data. The second check bit detector is configured to issue a stop signal immediately upon occurrence of that the check bit pattern fails to appear within a predetermined second detection time period shorter than one frame length of the first data. In this connection, the second power controller of the second radio terminal is configured to terminate a current receiving operation of the second receiver and associated components for processing the receiving data, in response to the stop signal. Thus, the second receiver can determine whether or not the receiving data is valid before completing reading the one frame length of the data, and stop current receiving operation immediately upon finding that the receiving data is invalid or lacks the check bit pattern. Accordingly, the second receiver can eliminate wasteful power consuming operation caused by noises, and can reduce battery consumption, in addition to the intermittent receiving operation. Therefore, the system can have a prolonged operation life even in a situation where noises of considerable level are expected.

The second power controller (60B) may be configured to terminate a current receiving operation of the second receiver (20B) when the receiving signal strength indication (RSS) is lower than the predetermined threshold. Also the second check bit detector (24B) may be configured to be enabled when the second signal intensity detector (22B) provides the RSS not lower than the above threshold, and to allow the second receiver (20B) to continue the current receiving operation when the check bit pattern appears within the second time period which is not shorter than the predetermined cycle. With this arrangement, the system can eliminate wasteful power consuming operation caused by the noise, yet receiving and reading the valid data successfully.

In this connection, the second power controller (60B) may be configured to extend the second detection time period to a second uw detection time period for detection of a unique word contained in the first data only when the check bit pattern appears at least once within the second detection time period, and to extend the second detection time period further to a second data detection time period for completely reading the first data only when the unique word is detected within the second uw detection time period. In this manner, the receiving terminal is enabled to continue receiving the first data so long as the first data include the valid unique word specific to the system.

Preferably, the second power controller (60B) is configured to terminate the second uw detection time period immediately when the check bit pattern first fails to appear at the predetermined cycle within the second uw detection time period, and to terminate the second data detection time period immediately when the check bit pattern fails first to appear at the predetermined interval within the second data detection time period. With this result, the system can regard the receiving data as invalid as soon as the check bit pattern fails to appear at the predetermined interval, and terminate the current receiving operation at an early stage of receiving the invalid data, thereby reducing the power consumption.

The check bit pattern is preferred to have a length of one byte, and the first check bit interpolator (32A) is configured to insert the check bit pattern in such a manner that the check bit pattern alternative with one byte fraction of the first data. In this instance, the second check bit detector is configured to have the second detection time period of three byte. With this scheme, the non-existence of the check bit pattern can be detected in a minimum time period corresponding to the three bytes length. Therefore, the system can shorten a time required for determination of noise and minimize the power consumption. However, the detection period of four bytes length to 10 bytes length may be suffice to shorten the time for determination of the noise.

In view of that the first data is generally structured to have the unique word preceding data fields and following a preamble of a synchronous bit series for synchronous data reception at the second receiver. In this instance, the first check bit interpolator is configured to insert the check bit pattern into a data stream beginning from the unique word, while the second power controller (60B) is configured to extend the second detection time to the second uw detection time period having a length equal to one frame length of the first data or more for detection of the unique word when the check bit pattern appears in the second detection time period. Also, the second power controller is configured to extend the second detection time further to the second data detection time period for reading the first data when the unique word is detected within the second uw detection time period. In this instance, the second power controller is configured to issue the stop signal when the check bit pattern fails first to appear at the predetermined cycle within the second uw detection time period or second data detection time period.

Alternatively, the first check bit interpolator may be configured to insert the check bit pattern into the data stream after the unique word. In this instance, the second power controller (60B) is configured to extend the second detection time to the second uw detection time period for detection of the unique word only when the check bit pattern appears in the second detection time, and further to the second data detection time period only when the unique word is detected in the second uw detection time period. In this instance, the second power controller is configured to issue the stop signal when the check bit pattern fails first to appear at the predetermined cycle within the second data detection time period. With this arrangement, the system can be easy to design uniqueness of the unique word. That is, even if any part of the original first data includes the same bit pattern as the unique word, such part is transformed to have the check bit pattern and cannot be confused with the unique word not interrupted by the check bit pattern. Accordingly, the second receiver can successfully find out the true unique word from within the received data, without requiring the system to employ any other sophisticated technique of bit-modifying the unique word to make the unique word more distinctive.

Most preferably, the first data is prepared by a non return-to-zero coding such that the second check bit detector can also function to achieve a bit synchronization for receiving the first data through the second receiver in response to the preamble. Thus, the second check bit detector can alone make the detection of the check bit pattern as well as the bit synchronization, contributing to simply the system arrangement.

In the present invention, it is preferred that the second radio terminal is configured to transmit a second data to the first terminal, and therefore include a second bit interpolator (32B) configured to insert the check bit pattern at the predetermined cycle into one frame of the second data to make up a second bit interpolated data to be transmitted to the first radio terminal. In this connection, the first radio terminal is configured to additionally include a first battery (14A) energizing the first radio terminal, a first signal intensity detector (22A) configured to provide a receiving signal strength indication (RSSI) and to deactivate the first receiver when the RSSI is lower than a predetermined threshold, a first power controller (60A) configured to intermittently activate the first receiver (20A) at predetermined intervals in order to receive the second bit interpolated data, and a first check bit detector (24A) configured to detect the check bit pattern from within the second bit interpolated data from the second radio transmitter. The first check bit detector is configured to issue a stop signal immediately upon occurrence of that the check bit pattern fails to appear at the predetermined cycle within a first detection time period shorter than one frame length of the second data. The first power controller (60A) is configured to terminate a current receiving operation of the first receiver (20A) in response to the stop signal from the first check bit detector. Thus, the system can allow bi-directional radio communication, yet reducing the battery consumption at either one of the first and second radio terminals.

Also in the system where the first radio terminal is designed to transmit and receive the data to and from the second radio terminal, the first detection time period on the side of the first radio terminal can be defined to be similar to that of the second radio terminal, as discussed in the above. Further, the second data may be prepared by the non return-to-zero coding such that the first check bit detector can alone make the detection of the check bit pattern as well as the bit synchronization.

These and still other advantageous features of the present invention will become apparent from the following detailed explanation of the preferred embodiment when taken in conjunction with the attached drawings.

BEST MODE FOR CARRYING OUT THE INVENTION

Figure 1:
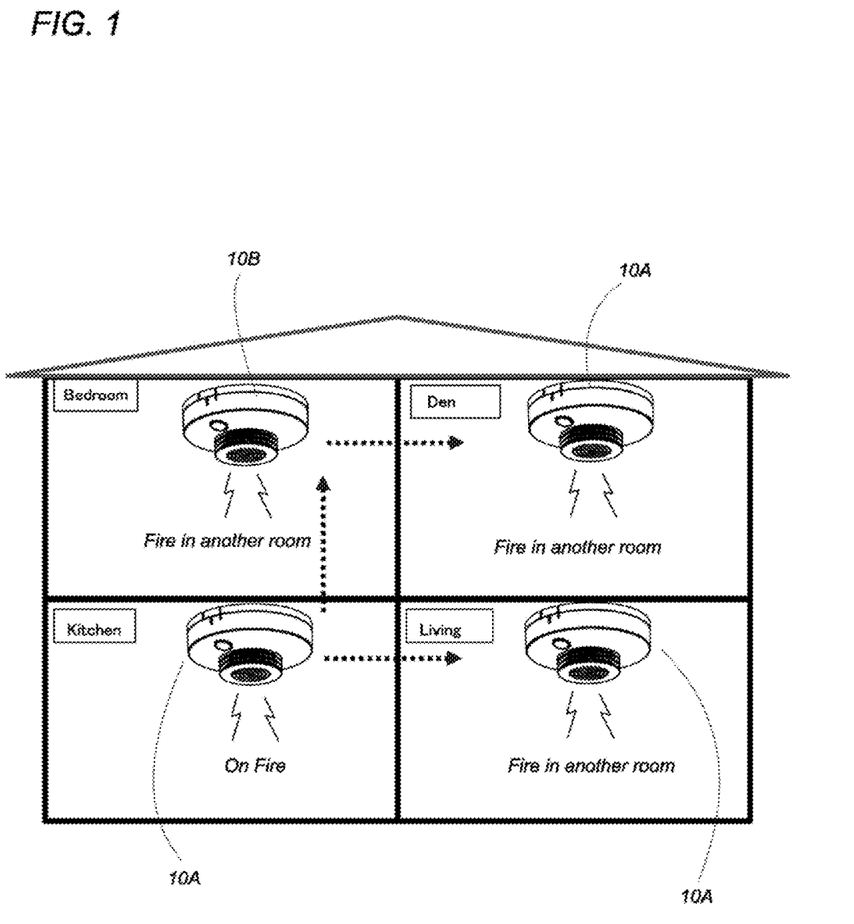
FIG. 1 is a schematic view illustrating a fire alarm system utilizing a radio communication system in accordance with the present invention.

Referring now to FIG. 1, there is shown a fire alarm system as one typical application of a radio communication system in accordance with the present invention, although such radio communication system can be utilized in many other applications. In brief, the fire alarm system includes a master station 10B installed in one particular room in premises, and a plurality of fire detecting terminals 10A installed in other rooms. The fire detection terminal 10A is configured to detect a fire occurrence and transmit a fire detecting message upon the fire occurrence to the other fire detecting terminals 10A as well as the master station 10B in order to give a fire alarm at each of the fire detecting terminals 10A and the master station 10B. The fire detecting message is generated on the fire detecting terminal and is transmitted by way of a radio communication proposed by the present invention. As will be discussed later, the master station 10B and the fire detecting terminal 10A are realized by one common module powered by an incorporated battery 14B (14A), and are designated to give respective functions as the master station and the fire detecting terminal by a master/slave selector.

Figure 2:
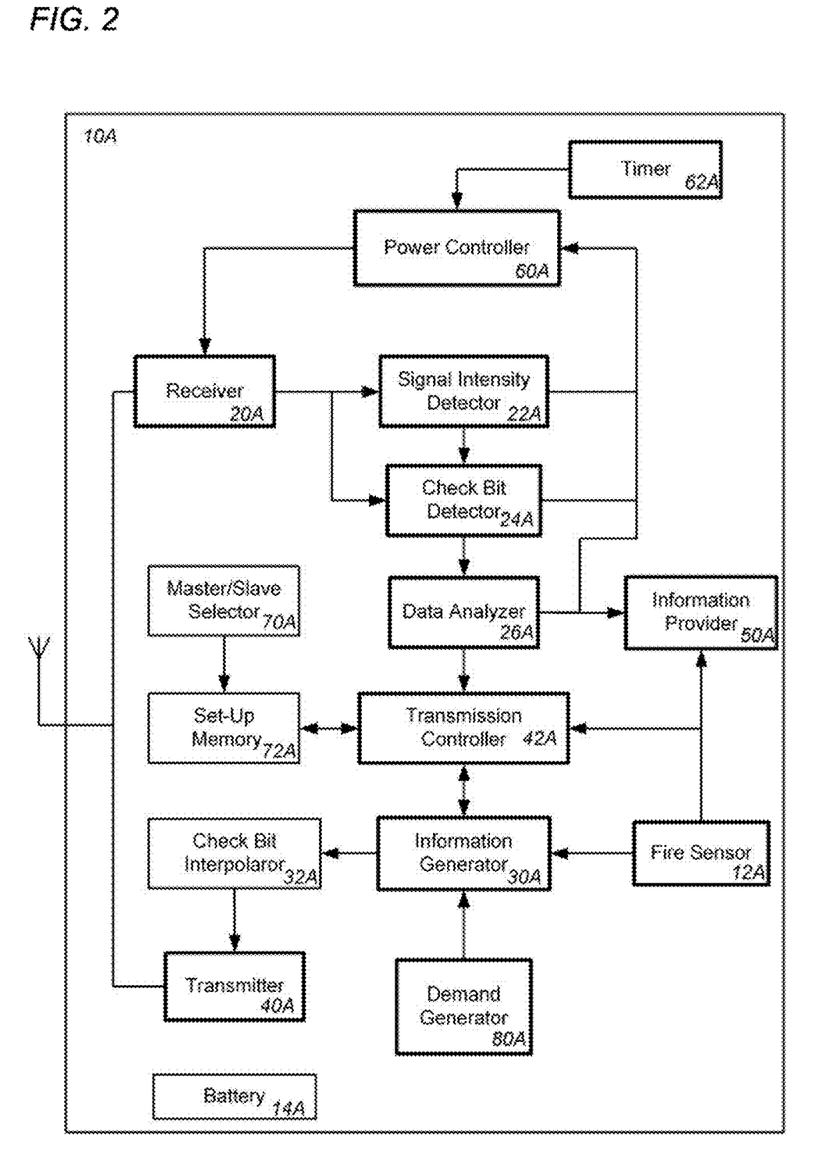
FIG. 2 is a block diagram of a first radio terminal (fire detecting terminal) utilized in the above system.
Figure 3:
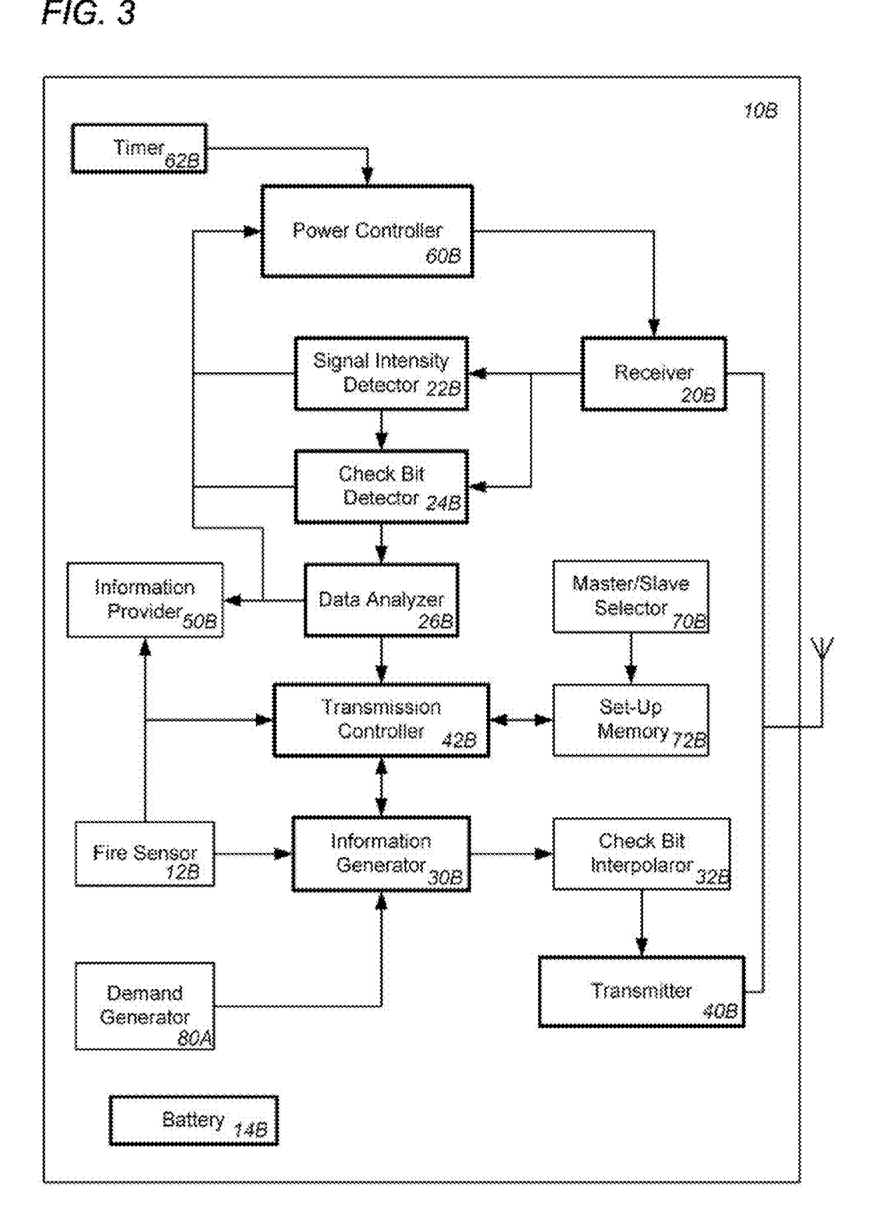
FIG. 3 is a block diagram of a second radio terminal (master station) utilized in combination with the first radio terminal in the above system.

FIGS. 2 and 3 show a configuration of the fire alarm system as one application of the radio communication system of the present invention which is defined in the claims and described in the disclosure of the invention to have a first radio terminal and a second radio terminal linked for radio communication with each other. In view of that the present invention is explained with reference to its application where the fire detecting terminals 10A are linked to communicate with the master station 10B as well as to communicate with each other, the following description is based upon a conception that the first radio terminal is interpreted as a transmitting terminal which may be the fire detecting terminal 10A or the master station 10B in the following description, and the second radio terminal is interpreted as a receiving terminal which may be the fire detecting terminal 10A or the master station 10B. However, for easy recognition of the relation between the first and second radio terminals, it is rather easy to conceive one particular transmission from the fire detecting terminal 10A to the master station 10B in which situation the first radio terminal is defined by the fire detecting terminal 10A and the second radio terminal is defined by the master station 10B, and another transmission from the fire detecting terminal 10A to the remaining fire detecting terminals 10A in which situation the first and second radio terminals are defined respectively by the fire detecting terminals 10A. Also in this connection, it is noted that components belonging to the first radio terminal 10A, 10B are mentioned in the claims and the disclosure of the invention to be preceded by a modifier term of "first", while components belonging to the second radio terminal 10A, 10B are mentioned to be preceded by a modifier term of "second", while such modifier terms are omitted from the drawings and the following description only for the sake of simplicity. Further, some data transmitted between the first terminal and the second terminal may be hereinafter referred to as a fire detecting message or a wake-up message.

Figure 4:
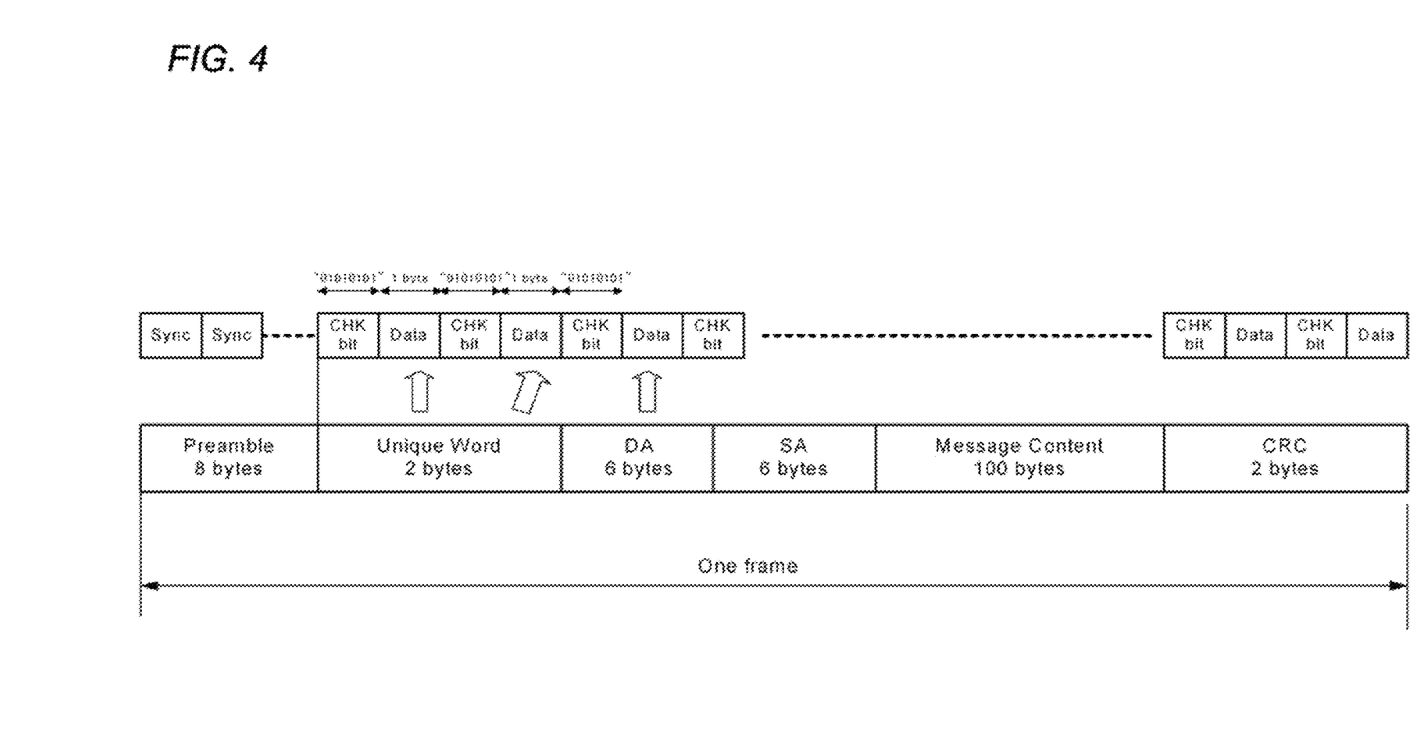
FIG. 4 is a schematic view of a data structure of a data transmitted between the first and second radio terminals.

FIG. 4 shows a data structure of the message or data transmitted between the first and second terminals. The data is basically structured to have a unique word of 2 bytes following a preamble containing a synchronous bit series of 8 bytes, a destination address of 6 bytes, a source address of 6 bytes, a message content of 100 bytes, and a CRC (cyclic redundancy check) of 2 bytes. For distinguishing the data from environmental noises, a check bit pattern of "01010101" is inserted at a predetermined cycle, i.e., one byte length cycle, into the data so as to give a bit interpolated data in which the check bit pattern starts from the beginning of the data frame, i.e., the unique word and ending at the CRC, and alternate with one byte fraction of the data. When the check bit pattern fails to appear in the receiving data, the system can determine that the receiving data is simply the noise or the data not intended to the present radio transmission system and operates in order to save a power, as will discussed hereinafter in detail.

Turning back to FIG. 2, the fire detecting terminal 10A is designed as the transmitting terminal to include a fire sensor 12A configured to detect a fire occurrence, an information generator 30A which generates the fire detection message upon detection of the fire occurrence, a check bit interpolator 32A configured to insert the check bit pattern of "01010101" into one frame of the data or message to give the bit interpolated data or the message of FIG. 4, and a transmitter 40A configured to transmit the bit interpolated fire detection message. The fire detecting terminal 10A is designed as also the receiving terminal to include a receiver 20A, a signal intensity detector 22A configured to provide a receiving signal strength indication (RSSI) of the received data, a check bit detector 24A configured to detect whether the check bit pattern appears in the received data, a data analyzer 26A configured to analyze the data and generate information designated by the data, and an information provider 50A configured to issue the information or fire alarm in the form of a voice. It is noted in this connection that the signal intensity detector 22A is made active with or without the check bit detector 24A and the data analyzer 26A when the receiver 20A receives any signal including the valid data or environmental noises of significant level, and consume the battery power. In this sense, the signal intensity detector 22A defines a signal processing section by itself or in combination with the check bit detector 24A and the data analyzer 26A. When the signal processing section is activated together with the receiver, the terminal 10A consumes a considerable battery power.

As shown in FIG. 3, the master station 10B is also configured as the receiving terminal to include a receiver 20B, a signal intensity detector 22B, a check bit interpolator 32B, and an information provider 50B which are all of the same configuration to corresponding ones of the fire detecting terminal 10A. The master station 10B is designed as the transmitting terminal to include a fire sensor 12B, an information generator 30B, a check bit interpolator 32B, and a transmitter 40B, all of which are of the same configuration to corresponding ones of the fire detecting terminal 10A. Also in the master station 10B, the signal intensity detector 22B is made active with or without the check bit detector 24B and the data analyzer 26B when the receiver 20B receives any signal including the valid data or environmental noises, and consume the battery power. Thus, the signal intensity detector 22B defines a signal processing section by itself or in combination with the check bit detector 24B and the data analyzer 26B. Thus, the master station 10B consumes a considerable battery power when the receiver is activated together with the signal processing section.

Further, the fire detecting terminal 10A and the master station 10B include respective timers 62A and 62B, and power controllers 60A and 60B. The power controller 60A (60B) is configured to intermittently activate the corresponding receiver 20A (20B) only for a limited reception period (Rp) of several tens of milliseconds, which repeat at predetermined intervals of about 5 to 10 seconds given by a timing signal from the corresponding timer 62A (62B) with the reception period alternating with a rest period. Thus, the receiver is kept in an idling mode only in the reception period with a minimum consumption of the battery power so as to be ready for receiving signal or data, while it is kept halted for the rest period without consuming the battery power. When receiving the signal or data in each of the reception period (Rp), the receiver becomes fully activated to start reading the signal or data with considerable battery consumption.

Figure 5:
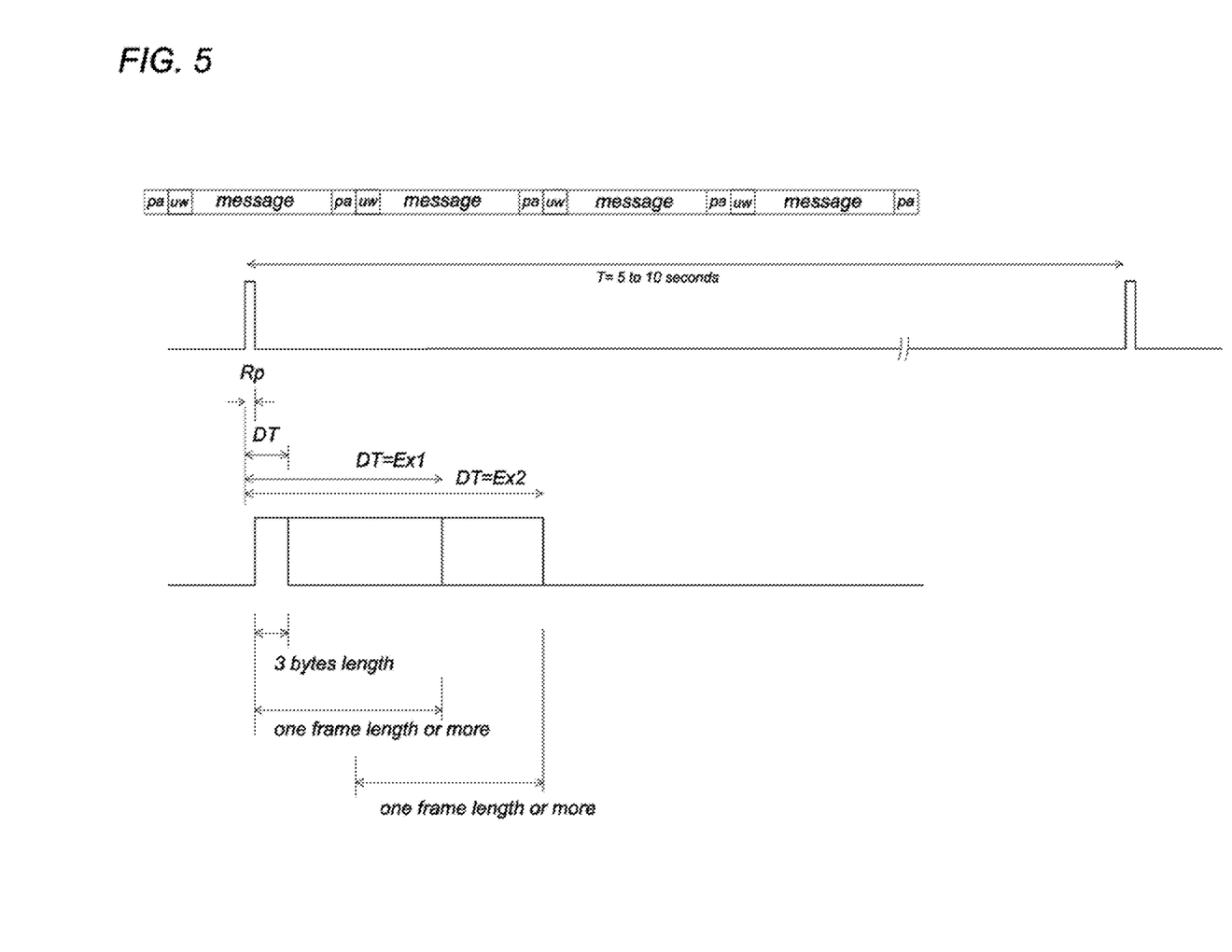
FIG. 5 is a time chart illustrating a data receiving operation of the above system.

An operation of the power controller is now explained with reference to FIGS. 5 and 6. Prior to discussing the operation, it is noted that the fire alarm system is configured to have an intermittent reception mode of activating each of the fire detecting terminals 10A and master station 10B intermittently to be ready for receiving the data or message, and a constant reception mode of constantly keeping the fire detecting terminal and the master station ready for receiving the data. The power controller is configured to select the intermittent reception mode until receiving the fire detection message or the wake-up message whichever comes earlier, and select the constant operation reception mode thereafter to receive the fire information message which establishes a multiple synchronous TDMA communication among the terminals and the master station. As shown in FIG. 5, the system is configured to transmit a series of the data or message until the constant reception mode is available. The fire detection message or the wake-up message is transmitted as a time series successive data. On the receiving side, it is first checked at each of the reception period (Rp) whether or not the RSSI of the received signal is greater than the threshold. When RSSI is found at the signal intensity detector 22B (22A) to be greater than the threshold within the reception period Rp, the power controller 60B (60A) responds to set a detection time period (DT) of a 3 bytes length from the start of the reception period (Rp) for checking whether or not the incoming message includes at least one check bit pattern "01010101". If the check bit detector 24B (24A) fails to acknowledge the check bit pattern, the power controller 60B (60A) responds to immediately terminate the detection period (DT) to deactivate the receiver 20B (20A) and the associated components until the next reception period (Rp). When the check bit pattern is acknowledged within the detection period (DT), the power controller 60B (60A) extends the detection period to a uw detection time period (DT=Ex1) of a length equal to one frame length of the message or more (DT=Ex1) to see whether or not the unique word is included in the received message. When no unique word is found within the uw detection time period (DT=Ex1, i.e., the receiving message is other than that specifically designed to the present system, the power controller 60B (60A) responds to immediately terminate the uw detection time period (Ex1) to deactivate the receiver 20B (20A) and the associated components until the next reception period (Rp). Otherwise, or when the unique word is found within the uw detection time period (Ex1), the power controller 60B (60A) authenticates the message and extends the detection time period further to a data detection time period (DT=Ex2) which ends at a point spaced by the one frame length or more from the start of the unique word founded, in order to complete reading the message. It is noted that if the check bit pattern should fail to appear within each two bytes length during the uw detection time period (Ex1) or data detection time period. (Ex2), the power controller 60B (60A) regards the receiving message is the noise or message not intended to the present system, and terminates the extended time period to terminate the instant receiving operation.

Figure 6:
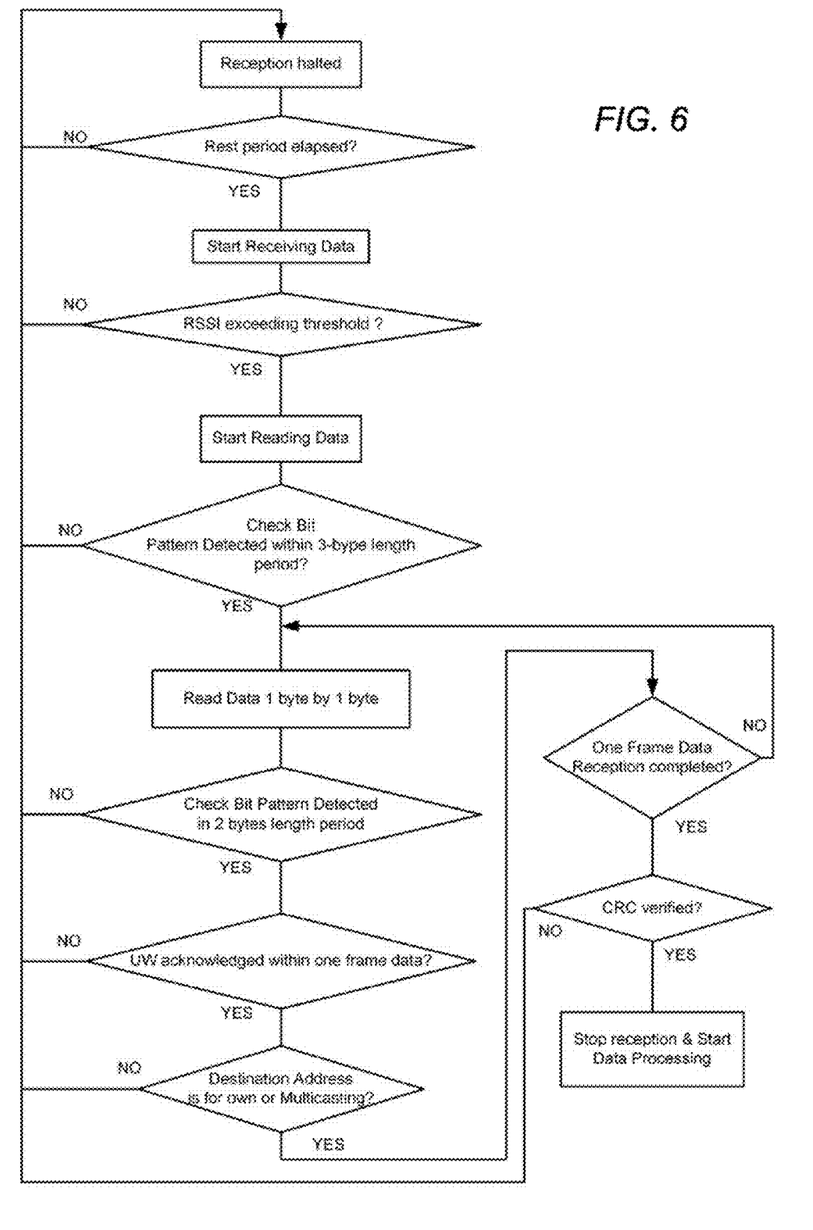
FIG. 6 is a flow chart illustrating the data receiving operation of the above system.

Details of the above noise or non-system message rejecting operation are illustrated in the flow chart of FIG. 6. First, when the reception halting rest period is over, the power controller 60B (60A) activates the receiver 20B (20A) to be ready fro receiving the data. A step follows to determine whether RSSI of the receiving signal exceeds a predetermined threshold at the signal intensity detector 22B (22A). When RSSI is found greater than the threshold, the detection time period (DT) corresponding to three bytes length is set to start receiving the message. Then, the check bit detector 24B (24A) checks whether the check bit pattern "01010101" appears at least once or twice within the detection time period (DT). If the check bit pattern fails to appear, the power controller 60B (60A) provides a stop signal for terminating the non detection period and therefore the current receiving operation to save the battery power. When the check bit pattern is acknowledged, the power controller 60B (60A) extends the detection time period (DT) to the uw detection time period (DT=Ex1) having one frame length or more so that the data analyzer 26B (26A) can read the preamble and determine whether the unique word is found within the uw detection time period (Ex1). If the unique word is not found, the power controller 60B (60A) responds to provide the stop signal for terminating the uw detection time period (Ex1) and deactivating the receiver 20B (20A) and the associated components to save the battery power. When the unique word is found, the detection time period is further extended to the data detection time period (Ex2) to complete reading the one frame message within a detection period of one frame length or more starting from the unique word. If the check bit pattern fails to appear at the predetermined cycle, i.e., 2 bytes length cycle during the uw or data detection time period, the power controller acknowledges that the receiving data is invalid and provides the stop signal for immediately terminating the current receiving operation to save the battery power as well.

In this manner, the receiving data is continuously checked. If the check bit detector 24B (24A) detects no further data within the data detection time period, the power controller provides the stop signal for terminating the instant receiving operation until next reception period. When, on the other hand, the data continues within the data detection time period, the data analyzer 26B (26A) checks whether the destination address in the receiving data designates own address of the transmitting terminal or those of the other receiving terminals. If the address is determined for its own or for multicasting to the other receiving terminals, the sequence goes to a step of checking whether one frame data reception is completed, and to check whether the CRC is verified. If one frame data reception is not completed, the data analyzer 26B (26A) requests the power controller 60B (60A) to continue activate the receiver 20B (20A) to read the remaining data 1 byte by 1 byte. If the CRC fails, the data analyzer 26B (26A) issues another stop signal to the power controller for immediately terminating the instant receiving operation. If the CRC is verified, the data analyzer 26B (26A) acknowledges the completion of the valid receiving data, stops the receiving operation, and starts a data processing for causing the information provider 50B (50A) to issue the information as instructed by the receiving data.

In brief, the data reception in the intermitted reception mode is terminated for saving the power as soon as one of the following conditions comes first:
1) The RSSI is detected in the reception period(Rp) to be lower than the threshold;
2) The check bit pattern fails to appear in the initial detection period (DT) beginning from the start of the reception period (Rp);
3) The unique word is not found in the uw detection time period (DT=Ex1);
4) The check bit pattern fails first to appear at the predetermined cycle in the uw detection time period (DT=Ex1);
5) The check bit pattern fails first to appear at the predetermined cycle in the data detection time period (DT=Ex2);
6) One frame data is not received in the data detection time period (DT=Ex1)
7) No further data is detected within the data detection period (DT=Ex1); and
8) CRC is not verified It should be noted here that the data is prepared by a non return-to-zero coding so that check bit detector 24B (24A) can be shared to make the function of achieving the bit synchronization for receiving the data in response to the preamble, and to make the function of detecting the check bit pattern.

Besides, it is equally possible that the system have the detection time period longer than 3 bytes length, for example, 4 bytes to 10 bytes. In such modification, the check bit detector 26B (26A) can be designed to check the number of the appearances of the check bit pattern in each detection time period and to provide the stop signal when the number of the appearance is smaller than a predetermined reference number.

Although the above embodiment describes that the check bit pattern is inserted in the data stream beginning from the unique word, the system of the present invention may have a configuration in which the check bit pattern is inserted in the data stream after the unique word in order to make the unique word sufficiently distinctive with a simple coding design.

Figure 8:
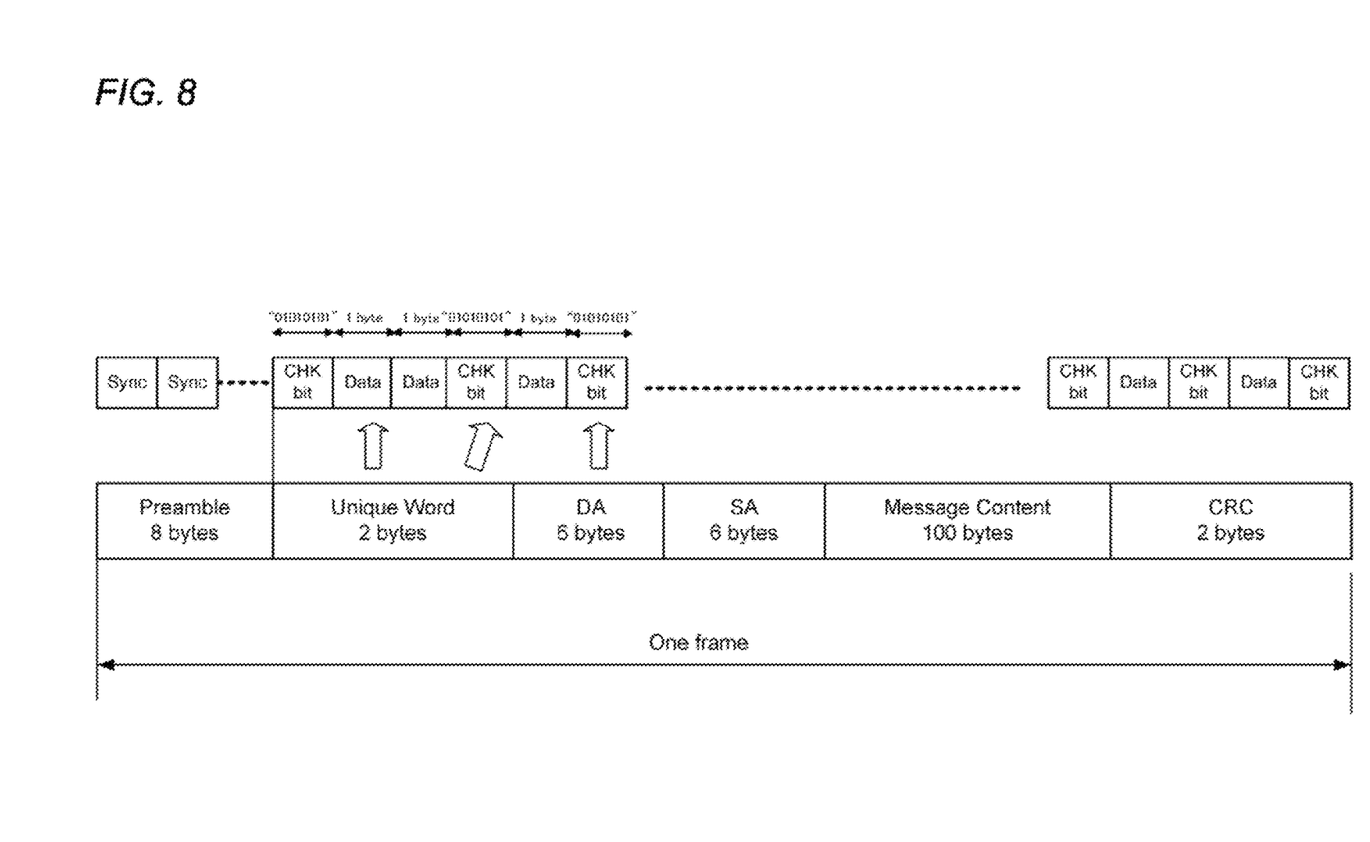
FIG. 8 is a schematic view of a data structure of the data transmitted between the first and second radio terminals in accordance with a modification of the above embodiment.

Further, as shown in FIG. 8, the present invention includes a modification of the above embodiment which is similar to the above embodiment except that the unique word is structured to include two bytes series data. The unique word having the 2 bytes series data not interrupted by check bit pattern "01010101" is designed to make the unique word more distinctive at the two byte series data than corresponding data fractions in the remaining message. In this instance, the initial detection time period (DT) is set to have a 4 byte length for checking whether one or two the check bit patterns appear tin the initial detection time period. After confirming the presence of the check bit pattern in the initial detection time period, the power controller extends the detection time period to the uw detection time period of one frame length or more and further to the data detection time period in much the same manner as in the above embodiment to check whether the check bit pattern appears at the predetermined cycle of 2 bytes in both of the uw detection time period and the data detection time period.

The details of the fire alarm system are now explained with reference to FIGS. 2, 3 and 7. In addition to the components as described in the above, the common module for the fire detecting terminal 10A and the master station 10B is equipped with the master/slave selector 70A (70B) for selectively designating the common module as the fire detecting terminal 10A and the master station 10B, and also with a set-up memory 72A (72B) configured to store addresses of associated terminals in addition to the designated role for multicast communication Also included in the common module is transmission controller 42A (42B) which fetches the addresses from the set-up memory 32A (32B) each time the fire detecting terminal or the master station transmits the data to include the destined addresses in the transmitting data prepared at the information generator 30A (30B). Further, the common module includes a demand generator 80A (80B) which is configured to generate a warning stop demand in response to a user's entry by use an interface such as a button or keypad. The demand is fed to the information generator 30A to be included in the transmitting data destined to the master station 10B to be processed thereat in order to stop the fire warning from the information providers 50B and 50A of the master station 10B as well as the fire detecting terminals 10A.

Figure 7:
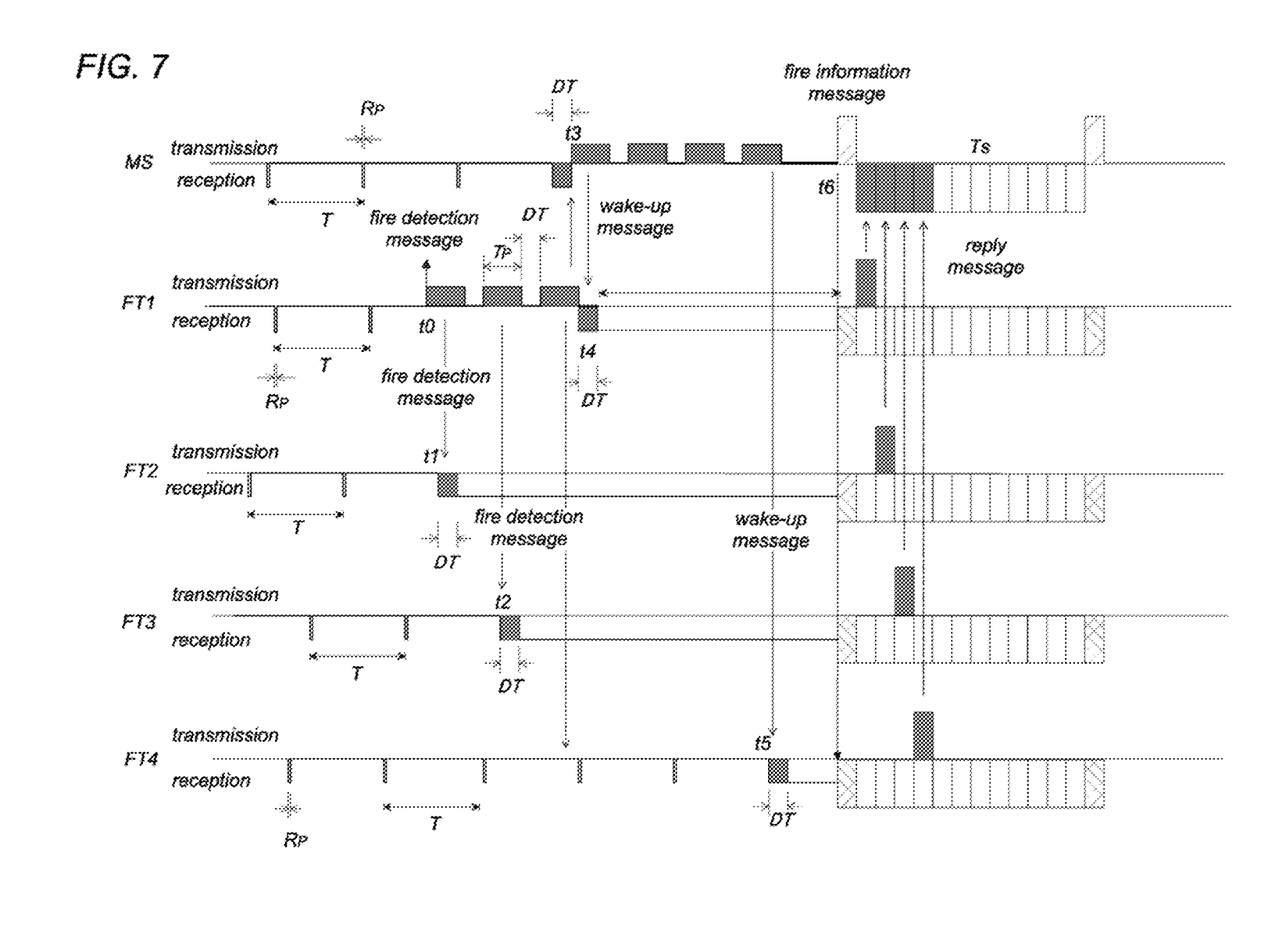
FIG. 7 is a time chart illustrating a fire detecting operation of the above fire alarm system.

Referring to FIG. 7, where the fire alarm system is exemplarily shown to have the four fire detecting terminals and the master station respectively labeled with FT1 to FT4, and MS for easy undersating of the operation. Each of the fire detecting terminals FT1 to FT4 and the master station MS are normally kept respectively in the intermittent reception mode where the individual power controllers 60A (60B) makes the corresponding receivers 20A (20B) ready for receiving signal in the reception period (Rp) alternating with the rest period, i.e., setting the receivers in an idling condition at regular intervals (T) of about 5 to 10 seconds. When any one of the fire detecting terminals 10A first detects the fire condition, for example, the fire detecting terminal of FT1 detects the fire condition at a time t0, the terminal FT1 responds to generate the data of fire detection message, concurrently with issuing the fire alarm from its own information provider. The fire detection message is destined to all the other fire detecting terminals FT2, FT3, FT4 and the master station MS, and is transmitted repeatedly in transmission period Tp alternating with reception period Rp. The fire detection message is successfully received at the other fire detecting terminals FT2, FT3 and the master station MS each having one of its intermittent reception periods coincident with any one of the transmission periods Tp. In the illustrated instance, the fire detecting terminals FT2 and FT3 receive the fire detection message respectively at times t1 and t2, and the master station MS receive the message at time t3. On the other hand, the terminal FT4 fails to receive the message when it spaced from the transmitting terminal FT1 by a distance greater than a maximum communication distance, or when the terminal FT4 receives a coincidental noise interfering with the message from terminal FT1, or even when any one of its reception periods Rp of the terminal FT4 is not coincident with any of the transmission periods Tp of the terminal FT1.

Upon receiving the fire detection message, the terminals FT2 and FT3 respond to issue the fire alarm from their own information providers 50A (50B), and are respectively switched into the constant operation mode in which the terminals are ready for the TDMA communication with the master station MS to receive and transmit further message and reply. The master station MS, when receiving the fire detection message at time t3, is switched into a wake-up mode of generating and transmitting a wake-up message to all the terminals FT1 to FT4. The wake-up message is intended to wake-up any remaining terminal FT4 which has not been switched into the constant operation mode by the fire detection message from the terminal FT1, and is repeated for a limited number of times to successfully switch the terminal FT4 into the constant operation mode at time t5 and to cause the terminal FT4 to issue the fire alarm. It should be noted in this connection that even when each of the fire detecting terminals FT1 to FT4 is located within the maximum communication distance for successful radio communication with the master station MS, there may be a situation that one of the fire detecting terminals FT1 to FT4 is located far beyond the maximum communication distance from one or more particular fire detecting terminals. For example, when the terminal FT4 is spaced further away from the detecting terminal FT1 issuing the fire detection message than from the master station, the terminal FT4 fails to receive the fire detection message. However, as the terminal FT4 is within the maximum communication distance from the master station MS, the terminal FT4 can successfully receive the wake-up message from the master station MS and be therefore switched into the constant reception mode. Further, if the terminal FT4 should fail to be woke up by the fire detecting message from the terminal FT1 due to the interference with the noise or misregistration between the reception period Rp of FT4 and the transmission period Tp of FT1, the terminal FT4 can be successfully woke up by the wake-up message repeatedly transmitted from the master station MS.

Upon receiving the wake-up message at time t4, the terminal FT1 is caused to stop transmitting the fire detection message and come into the constant reception mode to be ready for the TDMA communication with the master station MS. After transmitting the wake-up message for the predetermined number of times, the master station MS comes also into the constant reception mode to be ready for the TDMA communication with all the terminals FT1 to FT4.

Subsequently at time t6, the master station MS generates and transmits a fire information message which includes a statement of defining a series of timeslots TS assigned to each of the terminals FT1 to FT4, and includes a request for acknowledgment from each of the terminals FT1 to FT4 through the individual timeslots. During this transmission, the terminals FT1 to FT4 are held in constant communication with the master station for exchanging information and instructions for implementation of the fire alarm system. It is noted in this connection that the above mode switching is effected by the power controller 60A (60B) in combination with the data analyzer 26A (26B) in the respective terminal and the master station.

As apparent from the above explanation, the terminal and the master station are each functioning as the transmitting and receiving terminal, and specifically the fire detecting terminals function to transmit and receive the fire detection message with each other, in addition to communication with the master station. However, for easy interpretation of the present invention, the claims and the disclosure of the invention describe the claimed elements with reference numerals only with reference to one particular data transmission of the fire detection message from the terminal to the master station, although the such data transmission may be made between the fire detecting terminals or the other data transmission of the wake-up message is made from the master station to the terminals.

The invention claimed is:

1. A radio communication system comprising a first radio terminal and a second radio terminal which are linked for wireless communication with each other,
    said first radio terminal comprising:
        a first transmitter configured to transmit a first data indicative of a specific event;
    said second radio terminal comprising:
        a second battery energizing said second radio terminal;
        a second receiver configured to receive said first data from said first radio terminal;
        a data analyzer configured to analyze said first data and generate information designated by said first data;
        an information provider configured to output said information;
        a second signal intensity detector configured to provide a receiving signal strength indication,
    wherein
    said first radio terminal includes a first bit interpolator configured to insert a check bit pattern at a predetermined cycle into one frame of said first data to make up a first bit-interpolated data to be transmitted to said second radio terminal, said check bit pattern being a bit series of "0" alternating with "1"; and
    said second radio terminal includes a second power controller configured to intermittently activate said second receiver at predetermined time intervals in order to receive said first bit-interpolated data from said first transmitter;
    said second power controller being configured to terminate a current receiving operation by deactivating the second receiver when the receiving strength indication provided by said second signal intensity detector is lower than a predetermined threshold;
    said second power controller being configured to enable a current receiving operation for a predetermined second detection time period shorter than a length of said frame of the first data in order to receive the first bit-interpolated data from said first transmitter when the receiving strength indication is greater than the predetermined threshold,
    said second radio terminal includes a second check bit detector configured to find whether said check bit pattern is detected from within said first bit-interpolated data received from said first radio transmitter,
    said second check bit detector being configured to issue a stop signal immediately upon occurrence of that said check bit pattern fails to appear within a predetermined second detection time period shorter than a length of said frame of the first data;
    said second power controller being configured to terminate a current receiving operation of said second receiver in response to said stop signal from said second check bit detector.

2. A radio communication system as set forth in claim 1, wherein
    said second check bit detector is configured to be enabled when said second signal intensity detector provides said receiving signal strength indication not lower than said predetermined threshold, and to allow said second receiver to continue said current receiving operation when said check bit pattern appears within said second detection time period which is not shorter than said predetermined cycle.

3. A radio communication system as set forth in claim 1, wherein
    said second power controller is configured to extend said second detection time period to a second unique word (uw) detection time period for detection of a unique word contained in the first data only when said check bit pattern appears at least once within said second detection time period, and to extend said second detection time period to a second data detection time period for completely reading said first data only when said unique word is detected within said second uw detection time period.

4. A radio communication system as set forth in claim 3, wherein
    said second power controller is configured to terminate said second uw detection time period immediately when said check bit pattern first fails to appear at said predetermined cycle within said second uw detection time period, and to terminate said second data detection period immediately when said check bit pattern first fails to appear at said predetermined cycle in said second data detection time period.

5. A radio communication system as set forth in claim 1, wherein
    said check bit pattern has a length of one byte,
    said first check bit interpolator being configured to insert said check bit pattern in such a manner that said check bit pattern alternate with one byte fraction of said first data,
    said second check bit detector being configured to have said second detection time period of three byte length.

6. A radio communication system as set forth in claim 1, wherein
    said first data is structured to have a unique word preceding data fields and following a preamble of a synchronous bit series for synchronous data reception at said second receiver, said first check bit interpolator is configured to insert said check bit pattern into a data stream beginning from said unique word, said second power controller being configured to extend said second detection time period to a second unique word (uw) detection period having a length equal to one frame length of said first data or more for detection of the unique word when said check bit pattern appears in said second detection time period, and to extend said second detection time period further to a second data detection time period for reading said first data when said unique word is detected in said second uw detection time period, said second power controller being configured to to issue said stop signal when said check bit pattern fails first to appear at said predetermined cycle within said second uw detection period or said second data detection time period.

7. A radio communication system as set forth in claim 1, wherein said first data is structured to have a unique word preceding data fields and following a preamble of a synchronous bit series for synchronous data reception at said second receiver, said first check bit interpolator is configured to insert said check bit pattern into a data stream after said unique word, said second power controller being configured to extend said second detection time period to a second uw detection period having a length equal to one frame length of said first data or more for detection of said unique word when said check bit pattern appears in said second detection time period, and to extend said second detection time period further to a second data detection period for reading said first data when said unique word is detected in said second uw detection time period, said power controller being configured to issue said stop signal when said check bit pattern fails first to appear at said predetermined cycle within said second uw detection time period or said second data detection time period.

8. A radio communication system as set forth in claim 1, wherein said first data is prepared by a non return-to-zero coding, said second check bit detector being configured to achieve, in response to said preamble, a bit synchronization for receiving said first data through said second receiver, in addition to the detection of said check bit pattern.

9. A radio communication system as set forth in claim 1, wherein said second radio terminal comprises:
  a second transmitter configured to transmit a second data signal to said first radio terminal; and
  a second bit interpolator configured to insert the check bit pattern at the predetermined cycle into one frame of said second data to make up a second bit-interpolated data to be transmitted to said first radio terminal;

said first radio terminal comprises:
  a first battery energizing said first radio terminal;
  a first receiver configured to receive said second data signal from said second radio terminal;
  a first signal intensity detector configured to provide a receiving signal strength indication,
  a first power controller configured to intermittently activate said first receiver at predetermined time intervals in order to receive said second bit-interpolated data from said second transmitter; and
  a first check bit detector configured to detect said check bit pattern from within said second bit-interpolated data received from said second radio transmitter, said first check bit detector being configured to issue a stop signal immediately upon occurrence of that said check bit pattern fails to appear at said predetermined cycle within a predetermined first detection time period shorter than a length of said frame of the second data;

wherein said first power controller is configured to terminate a current receiving operation by deactivating the first receiver when the receiving strength indication provided by the first signal intensity detector is lower than a predetermined threshold;

said first power controller being configured to enable a current receiving operation for a predetermined first detection time period shorter than a length of said frame of the second data in order to receive the second bit-interpolated data from said second transmitter when the receiving strength indication is greater than the predetermined threshold, said first power controller being configured to terminate a current receiving operation of said first receiver in response to said stop signal from said first check bit detector.

10. A radio communication system as set forth in claim 9, wherein said first check bit detector is configured to be enabled when said first signal intensity detector provides said receiving signal strength indication is not lower than said predetermined threshold, and to allow said first receiver to continue said current receiving operation when said check bit pattern appears within said first detection time period which is not shorter than said predetermined cycle.

11. A radio communication system as set forth in claim 9, wherein said first power controller is configured to extend said first detection time period to a first unique word (uw) detection time period for detection of a unique word contained in the second data only when said check bit pattern appears at least once within said first detection time period, and to extend said first detection time period to a first data detection time period for completely reading said second data only when said unique word is detected within said first uw detection time period.

12. A radio communication system as set forth in claim 11, wherein said first power controller is configured to terminate said first uw detection time period immediately when said check bit pattern first fails to appear at said predetermined cycle within said first uw detection time period, and to terminate said first data detection period immediately when said check bit pattern first fails to appear at said predetermined in said first data detection time period.

13. A radio communication system as set forth in claim 9, wherein said check bit pattern has a length of one byte, said second check bit-interpolator being configured to insert said check bit pattern in such a manner that said check bit pattern alternate with one byte fraction of said second data, said first check bit detector being configured to have said first detection time period of three byte length.

14. A radio communication system as set forth in claim 9, wherein
- said second data is structured to have a unique word preceding data fields and following a preamble of a synchronous bit series for synchronous data reception at said first receiver,
- said second check bit interpolator is configured to insert said check bit pattern into a data stream beginning from said unique word,
- said first power controller being configured to extend said first detection time period to a first unique word (uw) detection period having a length equal to one frame length of said first data or more for detection of the unique word when said check bit pattern appears in said first detection time period, and to extend said first detection time period further to a first data detection time period for reading said second data when said unique word is detected in said first uw detection time period,
- said first power controller being configured to issue said stop signal when said check bit pattern fails first to appear at said predetermined cycle within said first uw detection period or first second data detection time period.

15. A radio communication system as set forth in claim 9, wherein
- said second data is structured to have a unique word preceding data fields and following a preamble of a synchronous bit series for synchronous data reception at said first receiver,
- said second check bit interpolator is configured to insert said check bit pattern into a data stream after said unique word,
- said first power controller being configured to extend said first detection time period to to a first unique word (uw) detection period having a length equal to one frame length of said first data or more for detection of said unique word when said check bit pattern appears in said first detection time period, and to extend said first detection time period further to a first data detection period for reading said second data when said unique word is detected in said first uw detection time period,
- said first power controller being configured to issue said stop signal when said check bit pattern fails first to appear at said predetermined cycle within said first uw detection time period or said first data detection time period.

16. A radio communication system as set forth in claim 9, wherein
- said second data is prepared by a non return-to-zero coding,
- said first check bit detector being configured to achieve, in response to said preamble, a bit synchronization for receiving said second data through said first receiver, in addition to the detection of said check bit pattern.

* * * * *